Patented Sept. 5, 1944

2,357,613

UNITED STATES PATENT OFFICE 2,357,613

ALKALI METAL ACID SALTS OF OXIDATION PRODUCTS OF ABIETIC ACID

Leo Sternbach, Upper Montclair, N. J., assignor to Hoffmann-La Roche, Inc., Nutley, N. J., a corporation of New Jersey No Drawing. Application February 16, 1942, Serial No. 431,180. In Switzerland March 26, 1941

3 Claims. (Cl. 260—99)

My invention is concerned with the manufacture of well crystallized, easily obtainable salts of oxidation products of abietic acid.

It is known that the halogen-trihydroxy abietic acids react with an excess of alkali in water or organic solvents. However, no crystalline salt has ever been isolated from the resulting solutions.

It is, therefore, one object of my invention to develop a procedure which will yield salts of oxidation products of abietic acid in a well crystallized form without difficulty. Another object is the well crystallized salts themselves which, as far as I am aware, are new.

I have discovered that well crystallized salts of oxidation products of abietic acid can readily be obtained by the methods described below. Moreover, it has been found, quite surprisingly, that these compounds are valuable therapeutical agents in that they are very effective in stimulating the secretion of bile and, hence, can be used for medicinal purposes.

I have discovered that very well crystallizing salts of halogen free acids are formed in an excellent yield by treating the halogen-trihydroxy abietic acids in the presence of a water-soluble organic solvent or of a mixture of water with such solvent, with an amount of alkali insufficient to make the solution alkaline towards suitable indicators, such as phenolphthalein. Thus, I have obtained acid salts containing for one atom of alkali more than one molecule of the organic acid. On the basis of the analysis and the physical and chemical properties of these substances described in the appended examples, their constitution can be expressed by a general formula of the type shown below, although I want it to be distinctly understood that this formula is primarily intended for illustration and not as limitation:

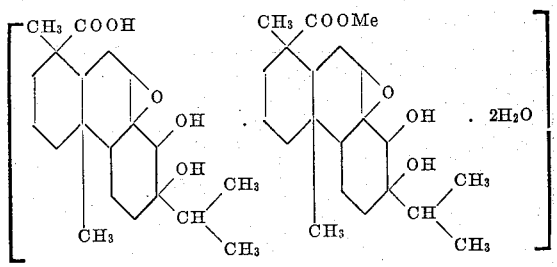

wherein Me represents an alkali metal.

In accordance with the principle of my discovery, these well crystallized acid alkali metal salts are formed always when the alkali salts of the aforementioned acids are permitted to react with the free acid itself in a water-soluble organic solvent or in a mixture of such solvent with water.

By way of illustrating the operation of this principle, the acid alkali metal salts can be obtained through various methods which by themselves are obvious to the expert, such as (a) reacting oxydo-dihydroxy, or halogentrihydroxy, or tetrahydroxy abietic acid with an amount of alkali insufficient for neutralization; (b) treating solutions of neutral salts of the aforementioned acids with the acids themselves; (c) treating solutions of the neutral salts of the aforementioned acids with less than one equivalent of another strong acid.

It is even possible to obtain these acid salts in good yields from the solution resulting by the oxidation of abietic acid, when adding to the solution of the mixture of the crude acid oxidation products less than the equivalent amount of alkali.

Best yields are obtained in all these cases, when the quantities of the components are selected so that they contain one atom of metal and two molecules of acid.

The new compounds are white, readily crystallizing materials which are very difficultly soluble in organic solvents and are only partly soluble in water. They can easily be dissolved in alkali. They strongly stimulate the secretion of bile and are to be used for medicinal preparations.

Example 1

57 parts by weight of crude bromo-trihydroxy-abietic acid, prepared in accordance with the process for the manufacture of chlorotrihydroxy-abietic acid ("Helvetica Chimica Acta," vol. 21, year 1938, page 574), are soaked with 40 parts by weight of absolute ethyl alcohol and treated with a solution of 3.27 parts by weight of sodium in 80 parts by weight of ethyl alcohol. The initially resulting solution becomes turbid on warming and solidifies after a short while by turning into a crystal mash. The mixture is cooled, filtered off after 14 hours and rinsed with a little absolute alcohol. The precipitate is again boiled with 70 parts by weight of absolute alcohol in order to remove any sodium bromide that may have been precipitated too. The yield amounts to 46 parts by weight of pure, colorless crystals.

If necessary the substance can be recrystallized from methanol. The compound melts between 220 and 250° C. under decomposition. With concentrated sulphuric acid it turns blood-red. It is very difficultly soluble in alcohol, ether and acetone and only partly soluble in water. On the other hand, it is readily soluble in dilute alkali; by using the corresponding quantity of alkali, neutral, clear, colorless solutions are obtained. The compound has a bitter taste; [alpha] D 18° = —12 to —13 (19% neutral solution in dilute aqueous caustic soda). The analysis showed the following result:

$C=63.22\%$  $H=9.18\%$  $Na=3.10\%$; equivalent weight=768.

The values calculated for the empirical formula $C_{40}H_{67}O_{12}Na$ are:

$C=62.97\%$  $H=8.85\%$  $Na=3.01\%$; equivalent weight=763.

Example 2

60 parts by weight of crude bromo-trihydroxy-abietic acid, of which 1 gram requires 3.9 cc. of 1 n NaOH in the phenolphthalein titration, are dissolved in 240 parts by weight of acetone and 40 parts by weight of alcohol while heating and neutralized with 240 parts by volume of 1 n NaOH (phenolphthalein being used as indicator). This solution is treated with a hot solution of 23.5 parts by weight of bromo-trihydroxy-abietic acid in 160 parts by weight of acetone and 16 parts by weight of alcohol. After two hours the reaction product, which has precipitated in the form of crystals, is filtered off. The yield is 69 parts by weight of the crystalline compound which is identical with the compound described in Example 1.

Example 3

4 parts by weight of bromo-trihydroxy-abietic acid are dissolved in 22 parts by volume of a 0.5 n alcoholic solution of caustic potassium hydroxide. The mixture is concentrated by boiling and then left to stand in a refrigerator for 14 hours for the purpose of crystallization. The precipitated crystals are collected on a filter and recrystallized from alcohol. Colorless prisms or flat needles are formed which melt between 230 and 260° C. The other physical properties correspond with those of the sodium salt obtained in accordance with Examples 1 and 2.

Example 4

2.4 parts by weight of chloro-trihydroxy-abietic acid (1 gram corresponds to 4.1 cc. of 1 n NaOH) are dissolved in 16 parts by weight of acetone and treated with 13.6 parts by weight of 0.5 n alcoholic potassium hydroxide. The potassium chloride precipitating after a few minutes is filtered off and the solution heated to boiling for 10 minutes, whereby the salt begins to separate in the form of crystals. The mixture is left to stand in a refrigerator for a few hours and then filtered. The product is identical with the potassium salt described in Example 3.

Example 5

600 parts by weight of abietic acid are oxidized in accordance with the directions given in "Helvetica Chimica, Acta," vol. 21, year 1938, pages 573 and 574. After filtering off the manganese dioxide, the alkaline aqueous solution is acidified with dilute sulphuric acid at 60° C., the separated precipitate collected and dissolved in about 2000 parts by weight of ether. Thereupon the ethereal solution is twice washed with water and dried with sodium sulphate. An aliquot portion of the solution is treated with the same quantity of water and double the quantity of alcohol and titrated with a $\frac{1}{10}$ n solution of caustic soda until added phenolphthalein shows the change of color. On this basis the quantity of 1 n alkali calculated for the neutralization of the entire quantity of the oxidation product dissolved in ether is 1200 to 1600 parts by volume. The ethereal solution is now evaporated, acetone being added towards the end of the evaporation in order to drive off the ether completely. The residue is then dissolved in ether (the total weight of the solution should amount to about 1300 parts by weight) and treated with half the quantity of the alcoholic-aqueous solution of caustic soda required for the neutralization. After 24 hours the salt has completely separated. For the purpose of further purification this salt is dissolved and allowed to crystallize in the following manner: 10 parts by weight are suspended in 30 parts by weight of acetone and brought into solution with 13 parts by volume of 1 n NaOH. The solution is filtered and treated with 13 parts by volume of 1 n HCl. The voluminous deposit precipitating thereby in the form of needles is collected on a filter, washed with a little alcohol and boiled up with 25 parts by weight of alcohol until it has turned into fine-grained prisms. These are filtered after cooling, washed with alcohol and dried. The product corresponds with that obtained in Example 1.

What I claim is:

1. Well crystallized alkali metal acid salts of oxidation products of abietic acid corresponding to the probable formula:

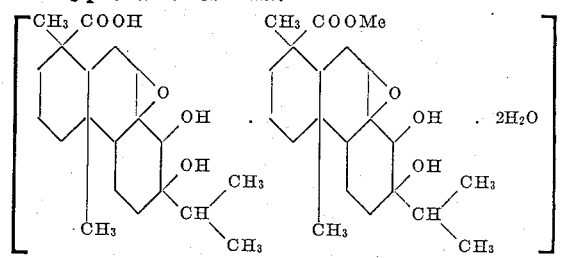

wherein Me represents an alkali metal.

2. Well crystallized acid sodium salts of oxidation products of abietic acid corresponding to the probable formula:

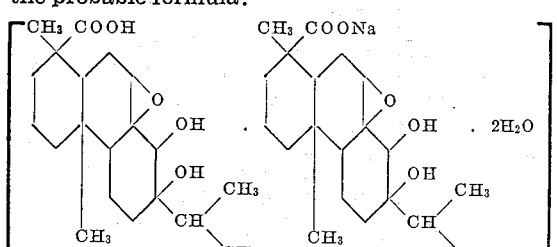

3. Well crystallized acid potassium salts of oxidation products of abietic acid corresponding to the probable formula:

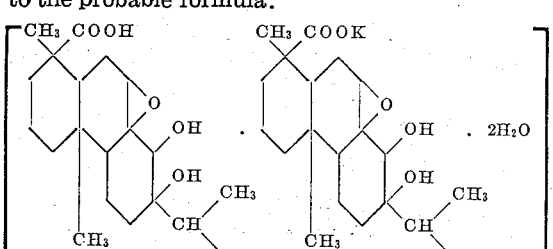

LEO STERNBACH.